W. Clemson
Saw.

No 75733 — Patented Mar. 24, 1868.

Attest:
Elisha P. Wheeler
Jos. A. Dent

Inventor
Wm Clemson

United States Patent Office.

WILLIAM CLEMSON, OF MIDDLETOWN, NEW YORK.

Letters Patent No. 75,733, dated March 24, 1868.

IMPROVEMENT IN SAWS.

The Schedule referred to in these Letters Patent and making part of the same.

TO ALL WHOM IT MAY CONCERN:

Be it known that I, WILLIAM CLEMSON, of Middletown, in the county of Orange, and State of New York, have invented a new and useful Improvement in Saws; and I do hereby declare that the following is a full, clear, and exact description thereof, which will enable others skilled in the art to make and use the same, reference being had to the accompanying drawings, forming part of this specification.

Figures 1, 2, 3:
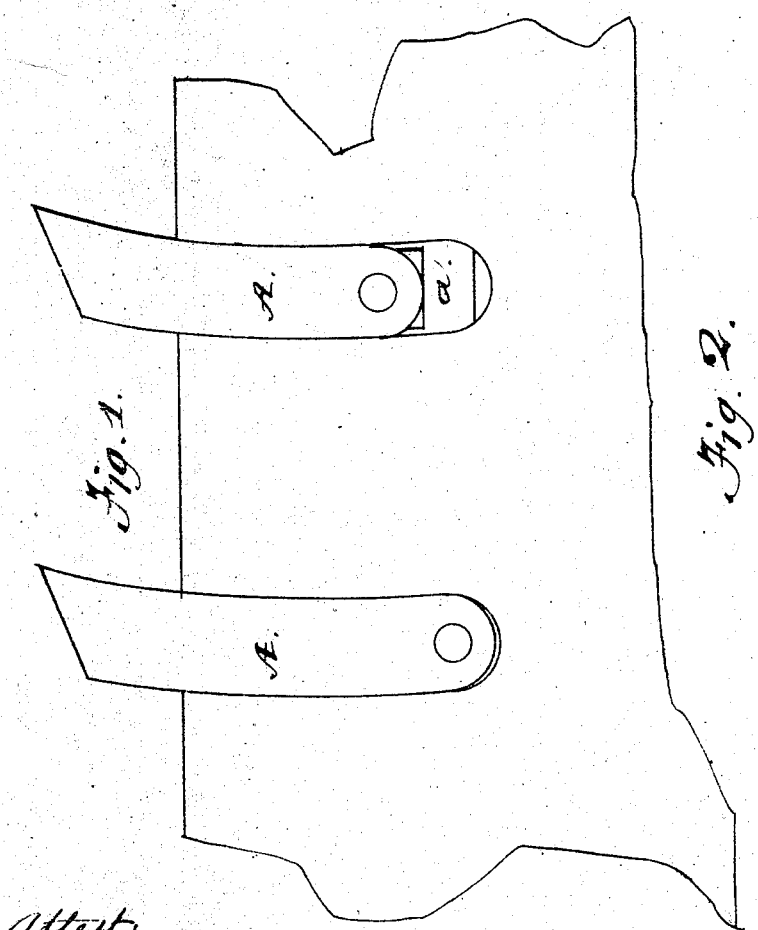
Figure 1 represents a side view of a section of saw-plate, with the teeth A inserted according to my invention.
Figure 2 represents a top or edgewise view of the same, showing a twist of the teeth alternately in opposite directions.
Figure 3 represents a view of a tooth edgewise, showing a curve sidewise in the direction of its length.

$a$, fig. 1, is a rest or packing for the teeth when worn short. It is formed with a less breadth than the width of the slot, to admit of its insertion under the tooth without taking the tooth from the slot.

This invention relates to a new method of securing teeth in the blades of circular and other saws, and consists in the use of narrow, curved, or straight teeth, which are fitted into corresponding slots of the saw-blade.

The lines of both the edges of the teeth are dissimilar to those formed by the edges of the slots, so that when the teeth are driven into the slots they will be constrained to conform to the form of the slots, and will thereby hold themselves in place by an elastic pressure on both edges of the slots. A straight tooth driven into a slightly-curved slot, or a slightly-curved tooth driven into a straight slot, has substantially the same effect in holding the tooth. I also, as an additional security against the teeth working loose, and also to afford a set to them, curve them sideways. Each tooth is turned in a contrary direction to the one next to it in the blade. I also twist each tooth, one to the right, the next to the left, alternately along or around the saw-blade, for the purpose of making the points of the teeth stand out laterally from the blade further than any other part of the teeth, to make them correspond to the ordinary set of solid-tooth saws, and also as a further means of increasing their hold on the blade.

The teeth are intended to be raised up and out of the slots as they wear away, but when raised up considerably out of the slots the gripe of the teeth is relaxed to a point where they may drive back in cutting knots. To prevent this, $a$, in fig. 1, shows a piece of steel, about the thickness of the plate, grooved on two sides to fit the slot, but narrower in its other or transverse diameter, to admit of insertion into the slot without taking the tooth entirely out. One or more can be used in each slot.

It will be seen, by making the two edges of the teeth and the corresponding edges of the slots of differing lines, I make a spring of the entire tooth, thus making it possible to use it when raised partly from the slot; consequently, I am able to use a much narrower tooth than is usual, which will effect an important saving in the first cost, and subsequently in files and labor in keeping the saw in order.

I claim as new, and desire to secure by Letters Patent—

1. The saw-tooth A, when constructed with a sidewise bend, forming a spring to hold it in the slot of the saw-plate, substantially in the manner and for the purpose described.

2. The saw-teeth A A, when constructed with a twist alternately in opposite directions, for the purpose of giving a set to the tooth, and an additional security in holding the tooth in the slot in the saw-plate, in the manner set forth.

3. The saw-tooth A, when constructed with a sidewise bend and a twist, substantially as described.

4. The saw-tooth A, when constructed with a sidewise bend, a twist, and having its sides on lines dissimilar to the lines on the edges of the slots in the saw-plate, substantially as described.

WM. CLEMSON.

Witnesses:
ELISHA P. WHEELER,
JOS. A. DENT.